US006525784B1

(12) United States Patent
Oya

(10) Patent No.: US 6,525,784 B1
(45) Date of Patent: Feb. 25, 2003

(54) PROJECTION TELEVISION RECEIVER

(75) Inventor: Tomoyuki Oya, Osaka (JP)

(73) Assignee: Matsushita Electrical Industrial Co., Ltd., Osaka (JP)

(*) Notice: Subject to any disclaimer, the term of this patent is extended or adjusted under 35 U.S.C. 154(b) by 338 days.

(21) Appl. No.: 09/596,588

(22) Filed: Jun. 19, 2000

(30) Foreign Application Priority Data

Jun. 25, 1999 (JP) .......................................... 11-179375

(51) Int. Cl.[7] ................................................ H04N 5/74
(52) U.S. Cl. ....................................... 348/749; 348/748
(58) Field of Search ................................ 348/749, 748; 313/35, 47, 36; 728/421; H04N 5/74

(56) References Cited

U.S. PATENT DOCUMENTS

| | | | | |
|---|---|---|---|---|
| 4,710,820 A | * 12/1987 | Roberts | ...................... | 358/231 |
| 4,737,678 A | * 4/1988 | Hasegawa | .................... | 313/36 |
| 5,476,717 A | * 12/1995 | Floch | ......................... | 428/421 |
| 5,981,059 A | * 11/1999 | Bright et al. | ............... | 428/336 |

FOREIGN PATENT DOCUMENTS

| | | |
|---|---|---|
| JP | 62-43278 | 2/1987 |
| JP | 4-314044 | 11/1992 |
| JP | 5-341167 | 12/1993 |

* cited by examiner

*Primary Examiner*—Victor R. Kostak
(74) *Attorney, Agent, or Firm*—RatnerPrestia

(57) ABSTRACT

Leak of refrigerant leak is prevented. Further, invasion of impurities into refrigerant liquid is prevented, and a stable projection image is obtained. The assembling steps are curtailed, and the projection television receiver is manufactured by a smaller number of assembling steps, and the cost is reduced. Moreover, a stable quality is maintained for a long period, and a high reliability is obtained. It includes a cathode-ray tube having a face surface, a projection lens disposed ahead of the face surface, a container disposed between the face surface and projection lens, a first sealing member disposed between the container and face surface, a second sealing member disposed between the container and projection lens, and liquid filling up the region enclosed by the container, face surface and projection lens. The container has a fluoride resin film disposed at least inside of the container, and the fluoride resin film contacts with the liquid.

26 Claims, 3 Drawing Sheets

PROJECTION TELEVISION RECEIVER

TECHNICAL FIELD

The present invention relates to a projection television receiver, and more particularly to a cathode-ray tube and an optical structure around lenses in a projection television receiver for magnifying and projecting an image displayed on a face surface of the cathode-ray tube by using a projection lens.

BACKGROUND OF THE INVENTION

In the projection television receiver, recently, it is a mainstream technology to inject a clear refrigerant liquid into an optical coupling of a cathode-ray tube and a projection lens for the purpose of enhancing the contrast performance and cooling.

The optical coupling includes a container (called also radiator hereinafter) and a refrigerant liquid contained in the container. The container is generally made of aluminum die-cast, and the aluminum die-cast is treated on the surface, and a black alumite film is formed.

A conventional projection television receiver is explained by referring to the drawing. FIG. 3 is a sectional view showing an example of the optical coupling in the conventional projection television receiver.

In FIG. 3, a cathode-ray tube 1 is sealed and fixed to a radiator 4 through a first O-ring 5. A projection lens 2 is sealed and fixed to the radiator 4 through a second O-ring 6. The region enclosed by the cathode-ray tube 1, projection lens 2 and radiator 4 is filled with a refrigerant liquid 3.

The radiator 4 is made of aluminum die-cast, and an alumite film 7 is formed on the surface. The alumite film is an aluminum oxide film formed by anodic oxidation of aluminum die-cast.

The conventional forming process of alumite film, however, required acid treatment as pretreatment for removing impurities on the die-cast surface. This acid treatment caused to roughen the surface of the radiator 4. If control of this treatment process is insufficient, the surface roughness of the radiator 4 fluctuates largely, possibly leading to seal failure. This seal failure involves a problem in quality control because it may lead to a liquid leak accident.

Further, to satisfy the optical performance, the surface of the radiator 4 is dyed in black. This black dyestuff is sometimes peeled off from the surface of the radiator 4 to drop into the refrigerant liquid. To prevent such peeling, it requires a step of cleaning the radiator 4 before assembling, and the step of cleaning the radiator 4 has caused to increase the number of manufacturing steps.

SUMMARY OF THE INVENTION

The projection television receiver of the invention comprises a cathode-ray tube having a face surface, a projection lens disposed ahead of the face surface, a container disposed between the face surface and projection lens, and liquid filling up the container, in which the container has a fluoride resin film disposed at least inside of the container, and the fluoride resin film contacts with the liquid.

Preferably, the projection television receiver further comprises a first sealing member disposed between the container and face surface, and a second sealing member disposed between the container and projection lens, in which the first sealing member is disposed in a state tightly contacting with the face surface and fluorine resin film to prevent the liquid from leaking out from between the container and face surface, and the second sealing member is disposed in a state tightly contacting with the projection lens and fluorine resin film to prevent the liquid from leaking out from between the container and projection lens.

Preferably, the fluoride resin film has a stable corrosion resistance to the liquid.

In this constitution, liquid lead is prevented. Further, peeling of film is prevented. A projection television receiver of high reliability is obtained. Moreover, the assembling process is curtailed, and the manufacturing cost is reduced.

REFERENCE NUMERALS

1 Cathode-ray tube
2 Projection lens
3 Refrigerant liquid
4 Container (radiator)
5 First O-ring (first sealing member)
6 Second O-ring (second sealing member)
7 Alumite film
8 Fluoride resin film

DETAILED DESCRIPTION OF THE INVENTION

A projection television receiver according to an embodiment of the invention comprises a cathode-ray tube having a face surface, a projection lens disposed ahead of the face surface, a container disposed between the face surface and projection lens, a first sealing member disposed between the container and face surface, a second sealing member disposed between the container and projection lens, and liquid filling up the space enclosed by the face surface, projection lens and container, and the surface of the container is coated with a fluoride resin. In this constitution, the smoothness of the container surface is improved. Further, the corrosion resistance of the container is improved. As a result, liquid leak is prevented. Also peeling of film is prevented, and a projection television receiver of high reliability is obtained. In addition, the assembling processes are curtailed, and the manufacturing cost is reduced.

Preferably, the fluoride resin film is applied in part or whole of the container surface. In this constitution, liquid leak is prevented. The reliability is enhanced. Further, the assembling processes are curtailed.

Preferably, the container is fabricated by aluminum die-casting. In this constitution, liquid leak is prevented. The reliability is enhanced. Further, the assembling processes are curtailed.

Preferably, the fluoride resin is made of polytetrafluoroethylene (PTFE). In this constitution, the above effects are further enhanced.

Preferably, the fluoride resin film is formed to make smooth the fine undulated surface of the container. When the container is formed by aluminum die-casting, the fluoride resin film is formed so as to fill up the recesses of the fine undulated surface of the aluminum die-cast.

Exemplary Embodiment

An optical coupling of a projection television receiver of an exemplary embodiment of the invention is described below while referring to FIG. 1.

Figure 1:
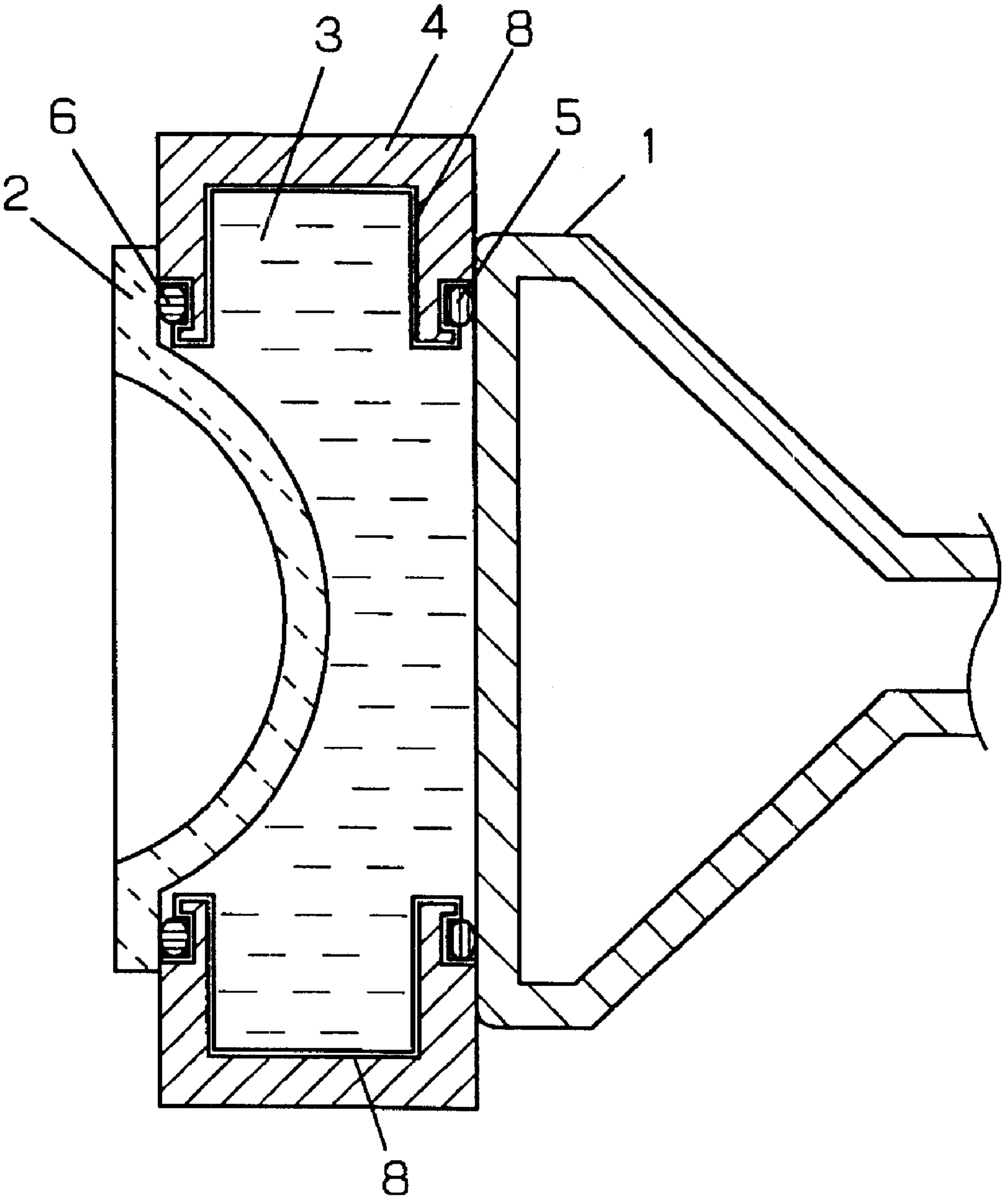
FIG. 1 is a sectional view showing a projection television receiver in an exemplary embodiment of the invention.

In FIG. 1, a cathode-ray tube 1 is sealed and fixed in a container 4 through a first sealing member 5. A projection lens 2 is sealed and fixed in the container 4 through a second sealing member 6. A fluoride resin film 8 is disposed on the surface of the container 4. The region enclosed by the cathoderay tube 1, projection lens 2 and container 4 is filled up with a refrigerant liquid 3. The cathode-ray tube 1, first sealing member 5, container 4, second sealing member 6, and projection lens 2 are mutually pressurized. As the first sealing member 5 and second sealing member 6, annular O-rings are used. The annular O-rings have an elasticity for compressing and deforming against pressurization. The container 4 and refrigerant liquid 3 compose an optical coupling. In this constitution, an image light is formed on the face surface of the cathode-ray tube 1. This image light passes through the refrigerant liquid 3 and gets into the projection lens 2. The image light is magnified by the projection lens 2, and is displayed on a screen (not shown).

The container 4 is manufactured by casting and forming aluminum. That is, the container 4 is manufactured by aluminum die-casting. The container 4 is a radiator. A fluoride resin film 8 is placed at least on the inner surface of the container 4. The container functions as radiator. The container 4 is formed by aluminum die-casting. The fluoride resin film 8 is disposed on the inner surface contacting with the refrigerant liquid 3. The fluoride resin film 8 is formed by dip coating method of immersing the aluminum die-cast in the paint, or spray coating method of spraying the paint on the surface of the aluminum die-cast. That is, the manufacturing method of the container 4 comprises a step of forming a die-cast molding of a specified shape by casting and forming aluminum, and a step of disposing the fluoride resin film 8 on the surface of the die-cast molding. For example, the step of disposing the fluoride resin film 8 includes a step of heating the die-cast molding, and a step of forming the fluoride resin film on the entire surface of the inner surface and outer surface of the die-cast molding by dipping (immersing) the heated die-cast molding in powder paint of fluoride resin. In this process, the powder of the fluoride resin contacting with the heated die-cast molding is fused, and simultaneously the fluoride resin film is adhered and formed. Or, the step of disposing the fluoride resin film 8 includes a step of applying a paint containing fluoride resin on a specified surface of the die-cast molding by spraying or dipping method, and melting and drying the adhered paint.

At these steps, the undulated surface of the die-cast molding is formed smoothly by the fluoride resin film. Examples of fluoride resin include polytetrafluoroethylene, polychlorotrifluoroethylene, polytetrafluoroethylene-hexafluoropropylene, polyvinylidene fluoride, copolymer of chlorotrifluoroethylene and vinylidene fluoride, and copolymer of vinylidene fluoride and hexafluoropropylene. In particular, polytetrafluoroethylene is preferable.

The thickness of the fluoride resin film 8 is preferred to be in a range of about 0.5 μm to about 200 μm. More preferably, the fluoride resin film 8 has a thickness in a range of about 5 μm to about 50 μm. If the thickness of the fluoride resin film 8 is less than about 0.5 μm, the smoothness of the fluoride resin film 8 is slightly inferior. If the thickness of the fluoride resin film 8 exceeds about 200 μm, the film thickness tends to be slightly unstable, and the material cost and manufacturing cost are higher.

The container has a first groove formed at the cathode-ray tube side, and a second groove formed at the projection lens side. The first sealing member 5 is positioned in the first groove. The second sealing member 6 is positioned in the second groove. Preferably, the first sealing member and second sealing member are disposed in contact with the groove bottom in pressurized state. As the sealing members 5, 6 are disposed in contact with the groove bottom, the sealing effect is further increased. More preferably, the fluoride resin film is disposed on the surface in the groove, and the sealing members are disposed in contact with the fluoride resin film in the grooves in pressurized state. In this constitution, the sealing effect is notably increased. Further, the fluoride resin film has a property to be compressed and deformed by pressurizing, and the sealing members and fluoride resin film are mutually pressurized, and contacting tightly as being compressed and deformed. In this constitution, the sealing effect is further increased.

The fluoride resin that is compressed and deformed by pressurization includes polytetrafluoroethylene, polyvinylidene fluoride, copolymer of chlorotrifluoroethylene and vinylidene fluoride, and copolymer of vinylidene fluoride and hexafluoropropylene.

As the refrigerant liquid 3, a clear liquid or a transparent liquid is used. For example, an organic solvent is used as the refrigerant liquid 3. The organic solvent includes, for example, a glycol compound. The reliability of sealing tightness of the refrigerant liquid 3 depends greatly on the smoothness of elements such as the container 4 contacting with the first sealing member 5 and second sealing member 6. That is, if the surface roughness of each element is large, liquid leak occurs from the contacting portions of the rough element with the first sealing member 5 or second sealing member 6. For example, when the surface roughness of the container 4 is more than about 1.8 μm, defective sealing occurs in the contacting portion of the container 4 and the first sealing member 5, and liquid leaks from this contacting portion.

In this embodiment, the face surface of the cathode-ray tube 1 and the projection lens 2 have a surface roughness of smaller than about 1.5 μm.

Figure 2:
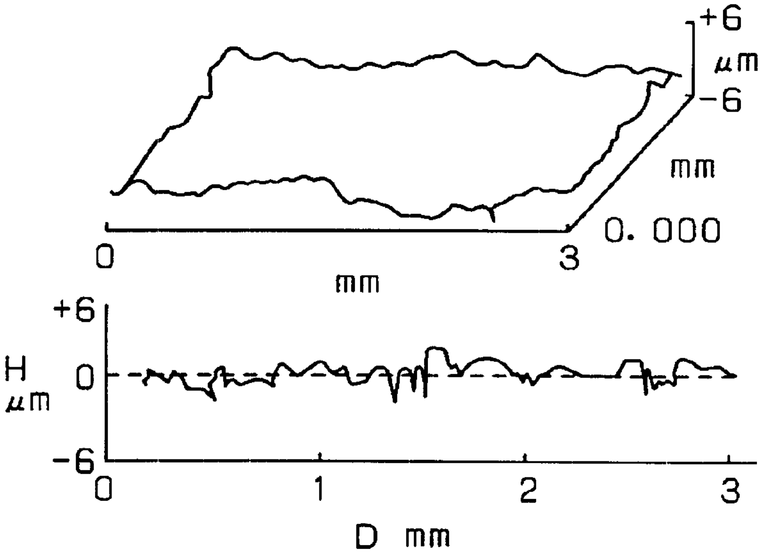
FIG. 2(*a*) is a measurement diagram of surface roughness of fluoride resin film after forming the fluoride resin film on the surface of aluminum die-cast for forming a container, and FIG. 2(*b*) is a measurement diagram of surface roughness of alumite film for forming the container.
Figure 2:
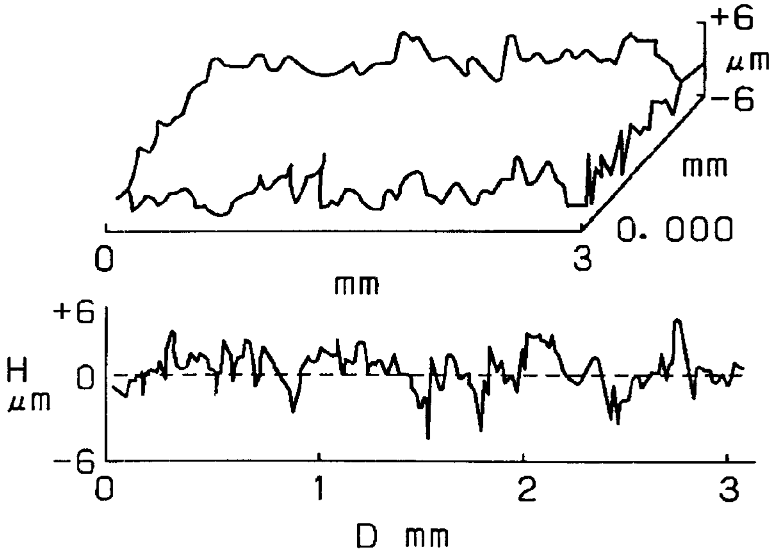
Figure 3:
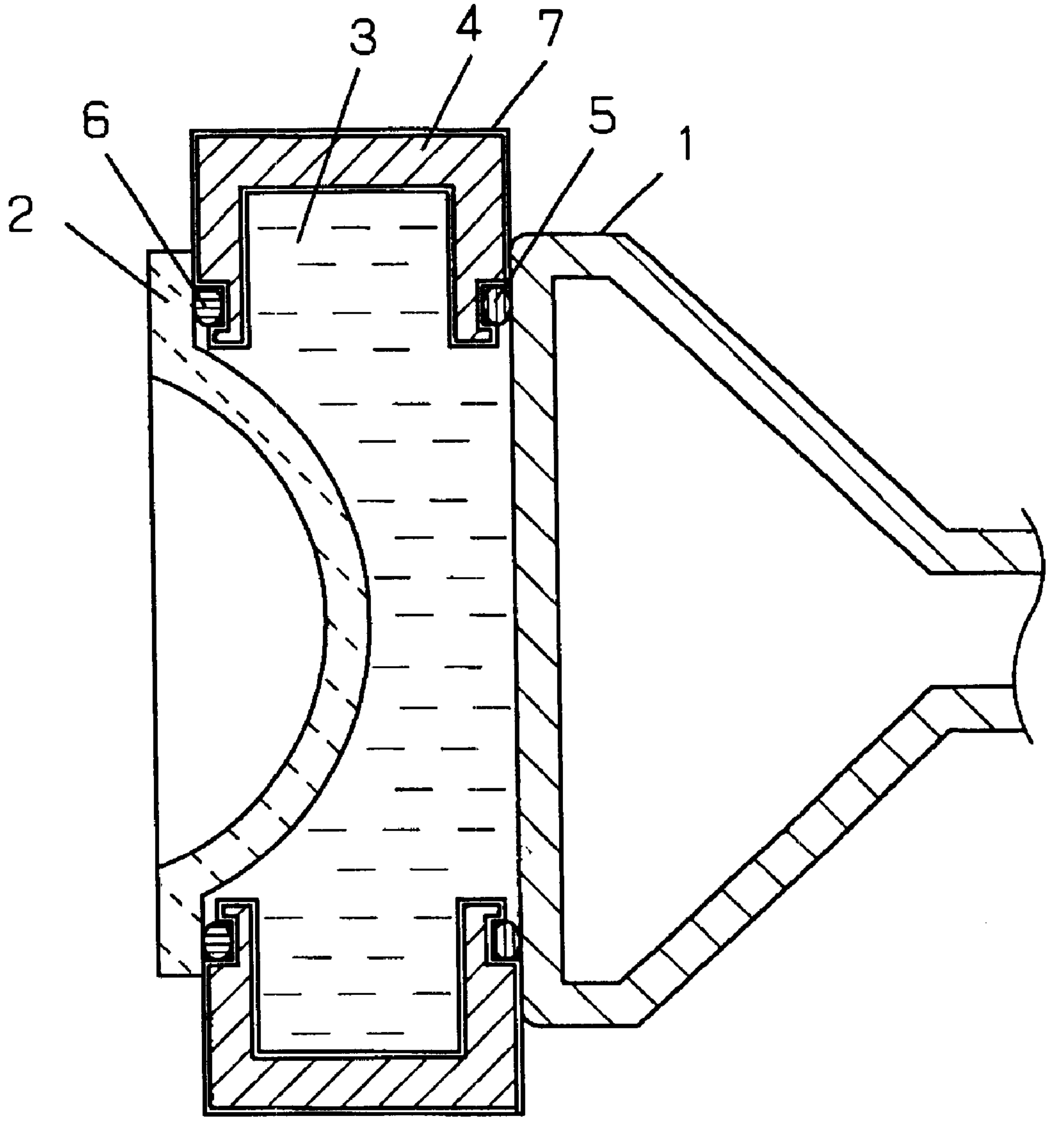
Fig. 3 PRIOR ART
FIG. 3 is a sectional view showing a conventional projection television receiver.

The surface roughness of the container having the fluoride resin film used in the embodiment manufactured by aluminum die-casting was measured by a three-dimensional surface roughness gauge. Results of measurement of surface roughness are shown in FIG. 2(*a*). The surface roughness "Ra" of the container having the fluoride resin film 8 was about 0.6 μm. Fluctuations of surface roughness were small.

By way of comparison, the surface roughness of the container made of conventional alumite was measured. Results are shown in FIG. 2(*b*). The surface roughness "Ra" of the container made of conventional alumite was about 2 μm.

The surface roughness of the container 4 is preferred to be less than about 1.5 μm, and more preferably 1.0 μm or less. If the surface roughness of the container 4 exceeds about 1.5 μm, the probability of occurrence of liquid leak is high.

In the process of forming the fluoride resin film 8 on the surface of aluminum die-cast, acid treatment is not required. By contrast, acid treatment is required in the process of forming a black alumite film by conventional anodic oxidation.

Thus, the container having the fluoride resin film 8 of the embodiment has a surface roughness of about ⅓ as compared with the conventional container having alumite film, and has a surface of an excellent smoothness. Therefore, the sealing tightness between the container 4 and first sealing member 5 is improved, and liquid leak is prevented. Thus, the reliability of the television receiver is notably enhanced.

During use of the projection television receiver, the cathode-ray tube 1 generates heat. Therefore, the refrigerant liquid 3 contained in the container 8 is heated to about 80° C. That is, the surface of the container 4 contacts with the refrigerant liquid 3 at about 80° C. for a long time. To evaluate the heat resistance and chemical resistance, the aluminum die-cast having polytetrafluoroethylene was immersed in the refrigerant liquid at 80° C. for 1000 hours, and the surface state of the container was observed, and also elution of impurities in the refrigerant liquid was checked. Glycol compound was used as the refrigerant liquid. As a result, the polytetrafluoroethylene film was free from peeling, dissolving, swelling, crack or other abnormality. Further, impurities were not detected in the refrigerant liquid. Impurities did not elute into the refrigerant liquid 3. That is, the fluoride resin film 8 is stable against the refrigerant liquid 3, and is not attacked, and has a corrosion resistance.

Such fluoride resin film is a kind of super-engineering plastics, and in particular such fluoride resin film has an excellent corrosion resistance to refrigerant liquid, and a superior resistance to heat. The container forming the fluoride resin film 8 has a stable heat resistance, solvent resistance, and corrosion resistance. Not required to clean before assembling, the cleaning step can be omitted. The excellent quality lasts long in the solvent at high temperature. Further, the fluoride resin film 8 disposed on the surface of the container contacts tightly with the sealing members 5, 6 in pressurized state, so that leak of refrigerant liquid 3 is prevented securely.

As the fluoride resin film, in particular polytetrafluoroethylene film is most preferred, and very excellent effects are obtained.

The fluoride resin film 8 has, preferably, a property to be compressed and deformed by pressurizing. In pressurized state, when the sealing members 5, 6 contact tightly with the fluoride resin film 8, fine bumps of the fluoride resin film 8 are compressed, and fine gaps between the sealing members 5, 6 and the fluoride resin film 8 are further made smaller. Therefore, the effect of preventing liquid leak is further enhanced. The film of polytetrafluoroethylene has a property to be compressed and deformed by pressurizing.

As clear from the exemplary embodiment, leak of refrigerant liquid is substantially prevented according to the invention. Further, invasion of impurities into the refrigerant liquid is substantially prevented, and a stable projection image is obtained. The assembling steps are curtailed, and the projection television receiver is manufactured by a smaller number of assembling steps, and the cost is reduced. Moreover, a stable quality is maintained for a long period, and a high reliability is obtained.

What is claimed is:

1. A projection television receiver comprising:

a cathode-ray tube having a face surface, a projection lens disposed ahead of said face surface, a container disposed between said face surface and projection lens, and liquid filling up a region enclosed by said container, face surface and said projection lens, wherein the container has a fluoride resin film disposed at least inside of said container, and said fluoride resin film contacts with said liquid.

2. The projection television receiver of claim 1, further comprising:

a first sealing member disposed between said container and said face surface, and a second sealing member disposed between said container and said projection lens, wherein said first sealing member is disposed in a state tightly contacting with said face surface and said fluorine resin film to prevent said liquid from leaking out from between said container and said face surface, and said second sealing member is disposed in a state tightly contacting with said projection lens and said fluorine resin film to prevent said liquid from leaking out from between said container and said projection lens.

3. The projection television receiver of claim 1, wherein said container has a molded body, said molded body has a surface with a predetermined surface roughness, said fluoride resin film is disposed on the surface of the molded body, and said fluoride resin film disposed on the surface of the molded body has a smaller surface roughness than the surface roughness of said molded body.

4. The projection television receiver of claim 1, wherein the surface roughness of said fluoride resin film is about 1.5 $\mu$m or less.

5. The projection television receiver of claim 1, wherein said fluoride resin film has a stable corrosion resistance to said liquid.

6. The projection television receiver of claim 1, wherein said container has an aluminum die-cast molded body, and said fluoride resin film is disposed on the surface of said aluminum die-cast molded body.

7. The projection television receiver of claim 1, wherein said fluoride resin film is polytetrafluoroethylene.

8. The projection television receiver of claim 1, wherein said fluoride resin film has a thickness in a range of about 0.5 $\mu$m to about 200 $\mu$m.

9. The projection television receiver of claim 2, wherein each of said first sealing member and said second sealing member has an elasticity to be compressed and deformed by pressurizing, said fluoride resin film has a property to be compressed and deformed by pressurizing, said fluoride resin film and said first sealing member contact with each other while being mutually deformed by pressurizing, and said fluoride resin film and said second sealing member contact with each other while being mutually deformed by pressurizing.

10. The projection television receiver of claim 2, wherein said fluoride resin film is disposed in a first contacting portion of said container and first sealing member, and in a second contacting portion of said container and second sealing member.

11. The projection television receiver of claim 2, wherein said fluoride resin film is disposed in a first contacting portion of said container and first sealing member, in a second contacting portion of said container and second sealing member, and in a third contacting portion of said container and refrigerant liquid.

12. The projection television receiver of claim 2, wherein said container has at least one groove of a first groove formed at the cathode-ray tube side and a second groove formed at the projection lens side, and at least one of said first sealing member and said second sealing member is positioned in said groove.

13. The projection television receiver of claim 12, wherein said fluoride resin film is disposed inside of the groove, and at least one of said first sealing member and said second sealing member contacts with the fluoride resin film in pressurized state.

14. The projection television receiver of claim 2, wherein said container has a first groove formed at the cathode-ray tube side and a second groove formed at the projection lens side, said first sealing member contacts with a bottom of the first groove in pressurized state, and said second sealing member contacts with a bottom of the second groove in pressurized state.

15. The projection television receiver of claim 2, wherein said container has a first groove formed at the cathode-ray tube side and a second groove formed at the projection lens side, said fluoride resin film is disposed inside of the first groove and inside of the second groove, said first sealing member is positioned in the first groove, said second sealing member is positioned in the second groove, each of said first sealing member and said second sealing member has an elasticity to be compressed and deformed by pressurizing, said fluoride resin film has a property to be compressed and deformed by pressurizing, said fluoride resin film and said first sealing member contact with each other while being mutually deformed by pressurizing, and said fluoride resin film and said second sealing member contact with each other while being mutually deformed by pressurizing.

16. The projection television receiver of claim 2, wherein said fluoride resin film is disposed at a position of contacting with at least one selected from the group consisting of said refrigerant liquid, said first sealing member and said second sealing member.

17. The projection television receiver of claim 2, wherein said fluoride resin film is disposed at a position of contacting with said refrigerant liquid, said first sealing member and said second sealing member.

18. The projection television receiver of claim 1, wherein said fluoride resin film is composed of at least one selected from the group consisting of polychlorotrifluoroethylene, polytetrafluoroethylene-hexafluoropropylene, polyvinylidene fluoride, copolymer of chlorotrifluoroethylene and vinylidene fluoride, and copolymer of vinylidene fluoride and hexafluoropropylene.

19. The projection television receiver of claim 1, wherein said fluoride resin film has a property of not causing at least one phenomenon selected from the group consisting of swelling, dissolving, peeling, and crack, in said liquid.

20. The projection television receiver of claim 2, wherein said container has a molded body, said molded body has a surface with a predetermined surface roughness, said fluoride resin film is disposed on the surface of the molded body, and said fluoride resin film disposed on a surface of the molded body has a smaller surface roughness than a surface roughness of the molded body.

21. The projection television receiver of claim 2, wherein the surface roughness of said fluoride resin film is about 1.5 $\mu$m or less.

22. The projection television receiver of claim 2, wherein said fluoride resin film has a stable corrosion resistance to said liquid.

23. The projection television receiver of claim 2, wherein said container has an aluminum die-cast molded body, and said fluoride resin film is disposed on a surface of said aluminum die-cast molded body.

24. The projection television receiver of claim 2, wherein said fluoride resin film is polytetrafluoroethylene.

25. The projection television receiver of claim 2, wherein said fluoride resin film has a thickness in a range of about 0.5 $\mu$m to about 200 $\mu$m.

26. The projection television receiver of claim 1, wherein said container is not subjected to an acid treatment.

* * * * *